Patented July 26, 1949

2,477,116

UNITED STATES PATENT OFFICE 2,477,116

PROTECTIVE COATING COMPOSITIONS AND METHODS FOR PRODUCING THE SAME

John C. Cowan and Howard M. Teeter, Peoria, Ill., assignors to the United States of America as represented by the Secretary of Agriculture No Drawing. Application July 18, 1944, Serial No. 545,528

2 Claims. (Cl. 106—243)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

The present invention relates to compositions adapted for use as protective coatings, and particularly to coating compositions derived from polymeric fat acids, and has among its objects the production of new products and compositions, especially from polymeric fat acids, which form improved coating compositions. Other objects of the invention will be apparent from the following description and claims.

Fat acids are aliphatic acids which occur usually in the form of their esters, such as glyceryl esters, in natural and in processed fatty and oily materials of vegetable and animal origin. Fat acids, the acyl radical of which contains a plurality of double bonds, are capable of undergoing polymerization (for instance, as a result of thermal treatment) and this property is common to a number of compounds containing acyl radicals of polymerizable fat acids containing substantially no monomeric fat acids.

In accordance with known processes, polymeric fat acids may be obtained by subjecting substances containing polymerizable fat acids or their derivatives, such as glycerides or other esters, to polymerization and then eliminating the non-polymerized or monomeric fraction from the treated material. For instance, according to one procedure, polymeric fat acids are obtained from fatty oils containing glycerides of polymerizable fat acids, such as oils of the drying and semi-drying type like peanut oil, cotton seed oil, wheat oil, soybean oil, corn oil, linseed oil, perilla oil, or dehydrated castor oil. These oils are polymerized in the usual manner, for example by thermal treatment, either in the presence or in the absence of suitable polymerization catalysts, and the polymeric glycerides are then isolated, for example, by distillation, and converted to the polymeric fat acids by hydrolysis. According to a second procedure, the fatty oils are subjected to alcoholysis with monohydric alcohols, such as methanol or ethanol, thereby converting the glycerides of the fat acids to the corresponding monohydric esters, and these esters are then polymerized yielding monohydric esters of polymeric fat acids which can be segregated from the reaction products by distillation and then converted to polymeric fat acids by hydrolysis. According to a third procedure, the fat acids are produced by hydrolysis of the fatty material and are then polymerized.

The term "polymeric fat acids" as herein used refers to the class of materials as above described.

It is known that the polymeric fat acids may be used in certain types of coating compositions. However, according to the present invention, it has been discovered that certain new, water-insoluble metal salts of polymeric fat acids may be formed, said metals being selected from the group consisting of magnesium, calcium, barium, strontium, zinc and cadmium, which salts are water-insoluble, resinous materials, and that these metal salts, which contain substantially no metal salts of monomeric fat acids, may be heated with one or more drying oils until a homogeneous blend of the proper body is obtained, thinned with a solvent, such as turpentine or mineral spirits, and then mixed with suitable dryers, thereby yielding improved protective coating compositions.

It has also been discovered that the zinc salt of polymeric fat acids, which contains substantially no zinc salt of monomeric fat acids, may be caused to dissolve in volatile organic solvents in the presence of organic amines, like ethylamine, butyl amine, piperidine, and pyridine, or in the presence of the zinc salt of rosin, and that such solutions are suitable for application as spirit varnishes.

The water-insoluble metal salts of polymeric fat acids above referred to may be prepared according to this invention by several processes. One process consists in preparing an aqueous solution of a water-soluble salt of the metal, such as the chloride or nitrate, and mixing this solution with an aqueous solution of a soluble salt of the polymeric fat acids, like the potassium, sodium, or other alkali-metal salt. Preferably, the solutions are mixed in such proportions that one equivalent weight of the soluble salt of the polymeric fat acids may react with one equivalent weight of the soluble salt of the metal.

Good working conditions obtain by the use of a 0.5 normal solution of the soluble salt of the metal and a 0.2 normal solution of the soluble salt of the polymeric fat acids, although other concentrations may be employed. Preferably, the potassium salt of the polymeric fat acids, which may be prepared by dissolving polymeric fat acids in aqueous potassium hydroxide containing 1.25–1.50 equivalents of alkali per equivalent of the polymeric fat acids, is used. The equivalent weight of the polymeric fat acids may be determined by titration with a standard solution of alkali.

The resulting water-insoluble metal salt of polymeric fat acids then precipitates in a granular form and it may readily be separated from the supernatant liquid and dried. Drying may be accomplished in a conventional manner, such as drying in a current of air, drying under reduced pressure, or drying by fusion. Depending upon the method of drying, the product is obtained either as a granular substance or as a hard glossy resin in a substantially pure form. For the purpose of this invention it is immaterial whether it is obtained as a granular substance or as a hard glossy resin.

In preparing coating compositions with the water-insoluble metal salts of polymeric fat, as above obtained, the resinous salt may be substituted as a varnish resin in place of natural resins. In order to effect compatibility with the varnish or drying oil, it is necessary to dissolve the resinous salt in the oil at an elevated temperature, for example, at about 300° C. and it is convenient to carry out the bodying or "cooking" process relative to the oil in the presence of the resinous salt. When the desired degree of body is obtained, the mixture may be cooled and thinned by addition of a suitable solvent, such as xylene, mineral spirits or turpentine. Suitable amounts of dryers, such as lead and cobalt naphthenates, may also be added.

If desired, the metal salts of polymeric fat acids salt of the metal may be formed directly in the varnish composition. This is preferably accomplished by dissolving the polymeric fat acids in the varnish or drying oil, or in a mixture of these oils, and reacting the polymeric fat acids with an oxide of the desired metal therein. According to this process the polymeric fat acids are dissolved in an amount of drying or semi-drying oil or mixtures thereof, which is determined by the oil-length of the resulting varnish. The solution is heated to about 300° C. and while the temperature is maintained an amount of oxide of the desired metal, or mixture of the oxides, equivalent to the amount of polymeric fat acids used is added slowly. Moderate foaming occurs as a result of the liberation of water formed in the reaction. When foaming ceases, the composition of the varnish may be completed in the usual way.

The following examples exhibit the invention in greater detail. Examples I-V show production of the substantially pure polymeric metal salts of fat acids.

Example I

Two liters of a 0.17 normal solution of the potassium salt of polymeric fat acids, prepared by dissolving 100 gm. of polymeric fat acids in 2 l. of water containing 26 gm. of potassium hydroxide, was added slowly with vigorous stirring to 1 l. of a 0.5 normal solution of zinc chloride. The resulting granular precipitate was collected, washed, and dried giving a zinc salt of polymeric fat acids weighing 98 gm. and containing 12 percent combined zinc. The product (zinc salt of polymeric fat acids) was a clear, hard orange resin melting at 130° C.

Example II

By substitution of calcium chloride for zinc chloride in Example I, the calcium salt of polymeric fat acids is obtained as a light tan granular powder having a melting point above 200° C. and containing 5 percent combined calcium.

Example III

By substitution of strontium chloride for zinc chloride in Example I, the strontium salt of polymeric fat acids is obtained as a light tan granular powder having a melting point above 200° C. and containing 12.2 percent combined strontium.

Example IV

By substitution of barium chloride for zinc chloride in Example I, the barium salt of polymeric fat acids is obtained as a light tan granular powder having a melting point above 200° C. and containing 20.2 percent combined barium.

Example V

By substitution of magnesium chloride for zinc chloride in Example I, the magnesium salt of polymeric fat acids is obtained as a light tan granular powder having a melting point above 200° C. and containing 5 percent combined magnesium.

Examples VI-VIII show the preparation of coating compositions with the metal salts of polymeric fat acids as obtained in the foregoing examples.

Example VI

By the following procedure a 30-gallon oil length varnish was prepared from the zinc salt of polymeric fat acids and an alkali refined linseed oil which had been bodied to a viscosity of 70 seconds as measured in Gardner-Holt viscosity tubes. Forty-one grams of the zinc salt and 100 gm. of the linseed oil were heated together at 570° F. until a homogeneous solution was obtained. The solution was then heated an additional period until a seven-inch string was obtained from a cooled drop. In all, one hour's heating was required. The solution was then cooled and reduced to a viscosity of G on the Gardner-Holt scale by the addition of 500 ml. of mineral spirits. Sufficient cobalt naphthenate was then added to produce a concentration of 0.06 percent cobalt (as metal). The color of the resulting varnish was 11 on the Gardner scale. Films of the varnish set to touch in 10 hours as measured on the Sanderson drying meter. After 96 hours air-dry, a hard non-tacky film was obtained. A film baked at 150° for 45 minutes yielded a tack-free film having a hardness of 40 as measured by the Sward Hardness Rocker. Addition of 3 percent turpentine to the varnish reduced the setting time to 7.75 hours and increased the hardness of a baked film to 49.

Example VII

By substituting the calcium salt of polymeric fat acids for the zinc salt of Example VI, a cook of 100 minutes was required to produce an 8-inch string. Adding 350 ml. of mineral spirits and 0.06 percent each of cobalt and lead metals, in the form of naphthenates, yielded a varnish of viscosity G and color 13 on the Gardner scale. This varnish set to touch in 2¼ hours, but was still slightly tacky after 96 hours drying in air. Baking for 45 minutes at 150° gave a tack-free film of hardness 42 (Sward).

Example VIII

By substituting the magnesium salt of polymeric fat acids for the zinc salt and unbodied alkali-refined linseed oil for the bodied linseed oil of Example VI, a cook of 100 minutes produced an 8-inch string. Adding 450 ml. of mineral spirits and 0.06 percent each of cobalt and lead metals in the form of naphthenates gave a varnish of viscosity G and of color 13 (Gardner). Films of this varnish set to touch in 53 hours, and were still tacky after 96 hours air-dry. Baking a film 45 minutes at 150° C. gave a tack-free film having a hardness of 44 (Sward).

Examples IX–XI exhibit the invention according to the process in which the metal salts of polymeric fat acids are formed directly in the varnish composition.

Example IX

Thirty-six and eight-tenths grams of polymeric fat acids were added to 100 gm. of a commercial linseed oil bodied to a viscosity of 70 seconds. The mixture was heated to 540° F., and 5.35 gm. of zinc oxide was gradually added. Some foaming occurred because of liberation of water in the reaction of acid and base. The mixture was held at 540° F. for 40 minutes at the end of which time an 8-inch string was obtained from a cooled drop. The mixture was thinned to a viscosity of G with 410 ml. of mineral spirits, and 0.06 percent of cobalt metal in the form of the naphthenate was added. A film of this varnish set to touch in 8 hours and was tack free at the end of 96 hours. After baking a film 45 minutes at 150° C., a tack-free film was obtained having a hardness of 16 (Sward).

Example X

By substituting 3.71 gm. of calcium oxide for the zinc oxide in Example IX and using 38.4 gm. of polymeric fat acids, an 8-inch string was obtained after 70 minutes heating at 540° F. Dilution to a viscosity of G with 485 ml. of mineral spirits and the addition of 0.06 percent each of cobalt and lead metals in the form of naphthenates yielded a varnish of color 11 (Gardner), films of which set to touch in 2.25 hours, but were slightly tacky after 96 hours. A film baked 45 minutes at 150° C. had a hardness of 10 (Sward).

Example XI

By substituting 3.75 gm. of magnesium oxide for the zinc oxide in Example IX and using 39.5 gm. of polymeric fat acids, an 8-inch string was obtained after 60 minutes at 540° F. Dilution to a viscosity of G with 515 ml. of mineral spirits and the addition of 0.06 percent each of cobalt and lead metals, in the form of naphthenates, yielded a varnish, films of which set to touch in 13.25 hours, but were slightly tacky after 96 hours. A film baked 45 minutes at 150° C. had a hardness of 20 (Sward).

Examples XII and XIII show the preparation of spirit varnishes.

Example XII

Two grams of the zinc salt of polymeric fat acids was dissolved in a mixture composed of 6 ml. of Skellysolve C (a medium boiling petroleum ether), 4 ml. of absolute ethanol and 0.5 ml. of mono-n-butyl amine. A film of this solution cast on glass set to touch in 1 hour and dried to a hardness of 26 (Sward) in 48 hours. The slight surface tack remaining was removed by warming one-half hour at 70°–80° C.

Example XIII

Mixtures of the zinc salt of polymeric fat acids and zinc resinate were prepared according to the following schedule, sufficient xylene being added to give solutions containing 20 percent solids by weight.

| No. | Amount zinc salt of polymeric fat acids | Amount zinc resinate |
|---|---|---|
| 1 | 0.25 | 1.75 |
| 2 | 0.50 | 1.50 |
| 3 | 0.75 | 1.25 |
| 4 | 1.00 | 1.00 |
| 5 | 1.25 | 0.75 |

These solutions when coated on glass dried hard in one-half hour. After 48 hours the Sward hardnesses were 76, 78, 66, 62, and 62, respectively. Films from these solutions adhere strongly to metal.

The subject matter relating to the production of the metal salts of polymeric fat acids is claimed in divisional application, Serial No. 618,606, filed September 25, 1945.

Having thus described the invention, what is claimed is:

1. A process of preparing a spirit varnish comprising dissolving a zinc salt of polymeric fat acids containing substantially no zinc salt of monomeric fat acids in a volatile organic solvent in the presence of an organic amine.

2. A spirit varnish comprising a zinc salt of polymeric fat acids containing substantially no zinc salt of monomeric fat acids and zinc resinate dissolved in a volatile organic solvent.

JOHN C. COWAN.
HOWARD M. TEETER.

REFERENCES CITED

The following references are of record in the file of this patent:

UNITED STATES PATENTS

| Number | Name | Date |
|---|---|---|
| 654,689 | Thornton | July 31, 1900 |
| 1,974,799 | Gittings | Sept. 25, 1934 |
| 2,169,577 | Bradley | Aug. 15, 1939 |
| 2,202,849 | Grant | June 4, 1940 |
| 2,221,975 | Kenzie | Nov. 19, 1940 |
| 2,229,992 | Schmidt | Jan. 28, 1941 |
| 2,285,646 | Clocker | June 9, 1942 |
| 2,334,850 | Traylor | Nov. 23, 1943 |
| 2,341,239 | Percy | Feb. 8, 1944 |
| 2,373,015 | Cowan | Apr. 3, 1945 |

Certificate of Correction

Patent No. 2,477,116                                                       July 26, 1949

JOHN C. COWAN ET AL.

It is hereby certified that errors appear in the printed specification of the above numbered patent requiring correction as follows:

Column 1, lines 26 and 27, strike out the words "containing substantially no monomeric fat acids" and insert the same in line 29, after "acids" and before "may"; column 3, line 17, after "fat" and before the comma insert *acids*; and that the said Letters Patent should be read with these corrections therein that the same may conform to the record of the case in the Patent Office.

Signed and sealed this 21st day of February, A. D. 1950.

[SEAL]

THOMAS F. MURPHY,
*Assistant Commissioner of Patents.*